United States Patent
Makke et al.

(10) Patent No.: US 10,343,629 B2
(45) Date of Patent: Jul. 9, 2019

(54) SYSTEM, METHOD, AND APPARATUS FOR PRESERVING VEHICLE BATTERY

(71) Applicant: Ford Global Technologies, LLC, Dearborn, MI (US)

(72) Inventors: Omar Makke, Lyon Township, MI (US); Haysam M. Kadry, Dearborn Heights, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 114 days.

(21) Appl. No.: 15/277,791

(22) Filed: Sep. 27, 2016

(65) Prior Publication Data

US 2018/0086290 A1    Mar. 29, 2018

(51) Int. Cl.
*B60R 16/023*     (2006.01)
*B60R 16/03*      (2006.01)
(Continued)

(52) U.S. Cl.
CPC ............ *B60R 16/023* (2013.01); *B60R 16/03* (2013.01); *B60R 16/0315* (2013.01); *B60R 25/241* (2013.01); *G06F 7/00* (2013.01)

(58) Field of Classification Search
CPC ........ B60L 11/1861; B60L 11/18; G07C 9/00; G07C 9/00174; G08C 17/02; H04W 52/02; G06F 1/32; G06F 7/00
(Continued)

(56) References Cited

U.S. PATENT DOCUMENTS

| 8,473,153 B1 * | 6/2013 | Lickfelt ............... B60R 25/406 701/2 |
| 8,502,495 B2 | 8/2013 | Brombach et al. |

(Continued)

FOREIGN PATENT DOCUMENTS

| CN | 202053906 | 11/2011 |
| CN | 105599712 | 5/2016 |

(Continued)

OTHER PUBLICATIONS

GB Search Report dated Mar. 19, 2018 in GB Application No. 1715212.5 (4 pages).

*Primary Examiner* — Fritz M Fleming
*Assistant Examiner* — Jagdeep S Dhillon
(74) *Attorney, Agent, or Firm* — Frank Lollo; Neal, Gerber & Eisenberg LLP; James P. Muraff

(57) ABSTRACT

Embodiments include a vehicle power distribution unit comprising a plurality of connection paths respectively connecting a plurality of electric loads to a vehicle battery, and a power saving module configured to receive a key fob input indicating user selection of one of a plurality of vehicle power modes, and disconnect a subset of the plurality of electric loads from the vehicle battery based on specifications associated with the selected vehicle power mode. Other embodiments include a vehicle system comprising a power distribution unit including a plurality of connection paths respectively connecting a plurality of electric loads to a vehicle battery; a key fob configured to enable user selection of one of a plurality of vehicle power modes; and a power saving module configured to disconnect a subset of the plurality of electric loads from the vehicle battery based on specifications associated with the selected power mode.

17 Claims, 2 Drawing Sheets

(51) Int. Cl.
*B60R 25/24* (2013.01)
*G06F 7/00* (2006.01)

(58) Field of Classification Search
USPC ....... 307/10.1, 10.2, 9.1, 66, 64, 82; 701/36, 701/2
See application file for complete search history.

(56) References Cited

U.S. PATENT DOCUMENTS

| | | | |
|---|---|---|---|
| 9,872,254 B2* | 1/2018 | Pandya | H04W 52/0261 |
| 2005/0200201 A1 | 9/2005 | Jabaji | |
| 2006/0145811 A1* | 7/2006 | Nantz | B60R 25/209 340/5.72 |
| 2009/0224876 A1* | 9/2009 | McCall | B60R 25/2009 340/5.61 |
| 2015/0097524 A1* | 4/2015 | Paik | B60L 11/1861 320/109 |
| 2015/0329003 A1* | 11/2015 | Li et al. | B60L 11/1816 320/134 |
| 2016/0334853 A1* | 11/2016 | Ono | G06F 1/3212 |
| 2017/0200336 A1* | 7/2017 | Schmidt | G07C 9/00174 |
| 2017/0294973 A1* | 10/2017 | Hermann | H04B 17/3912 |
| 2017/0346878 A1* | 11/2017 | Baker | H04B 1/3822 |

FOREIGN PATENT DOCUMENTS

| | | |
|---|---|---|
| EP | 3118965 A1 | 1/2017 |
| GB | 2452491 A | 3/2009 |
| KR | 20100062615 | 6/2010 |
| KR | 20080022266 | 3/2011 |
| KR | 101379927 | 3/2014 |

* cited by examiner

SYSTEM, METHOD, AND APPARATUS FOR PRESERVING VEHICLE BATTERY

TECHNICAL FIELD

This application generally relates to vehicle power distribution boxes or modules and more specifically, a power distribution box configured to reduce battery drainage when the vehicle remains stationary for an extended period of time.

BACKGROUND

Existing vehicles typically include power distribution box or unit for distributing power to a wide variety of vehicle components, accessories, and other electrical loads within the vehicle. For example, automotive vehicle applications may include a power distribution box for distributing power from a 12 vots (V) vehicle battery to vehicle control modules, such as, for example, a powertrain controller, body controller, battery controller, and the like, as well as countless vehicle systems, modules, and devices, such as, for example, vehicle lighting, HVAC, windows, mirrors, wipers, infotainment system, navigation system, etc.

In some cases, when a vehicle remains parked for an extended period of time, for example, while the vehicle owner is away on an especially long trip or while the vehicle is placed in storage, the 12 V battery of the vehicle can become drained by the time the owner returns to the vehicle. This battery drainage may occur because, even though the vehicle controllers may be put into a "sleep" mode, quiescent currents in the order of micro amperes add up over time and cause the battery to drain. Also, while the sleep mode attempts to preserve battery charge, some vehicle controllers remain at least partially active in order to listen for incoming signals, such as, for example, signals for starting the vehicle, locking or unlocking the vehicle, etc. This active listening can cause the vehicle battery to drain over time as well. To avoid battery drain, some vehicle owners resort to disconnecting the vehicle battery altogether. However, disconnecting the battery can cause all vehicle settings to be reset or lost, forcing the vehicle owner to reconfigure this settings once the he returns to the vehicle.

Accordingly, there is still a need in the art for an improved technique to preserve vehicle battery when a vehicle remains stationary or parked for an extended period of time.

SUMMARY

The invention is intended to solve the above-noted and other problems by providing systems, methods, and apparatuses configured to, among other things, (1) provide several user-selectable vehicle power-saving modes, and (2) selectively disconnect certain electric loads of the vehicle from a vehicle battery based on the power-saving mode selected by the user.

For example, one embodiment includes a vehicle power distribution unit comprising a plurality of connection paths respectively connecting a plurality of electric loads to a vehicle battery, and a power saving module configured to receive a key fob input indicating user selection of one of a plurality of vehicle power modes, and disconnect a subset of the plurality of electric loads from the vehicle battery based on specifications associated with the selected vehicle power mode.

Another example embodiment includes a vehicle system comprising a power distribution unit including a plurality of connection paths respectively connecting a plurality of electric loads to a vehicle battery; a key fob configured to enable user selection of one of a plurality of vehicle power modes; and a power saving module configured to disconnect a subset of the plurality of electric loads from the vehicle battery based on specifications associated with the selected power mode.

Still another example embodiment includes a method for preserving battery power in a vehicle. The method comprises receiving, from a key fob, an input sequence indicating user selection of one of a plurality of vehicle power modes; and disconnecting, using a processor, a subset of a plurality of electric loads included in the vehicle from a vehicle battery based on specifications associated with the selected vehicle power mode.

As will be appreciated, this application is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
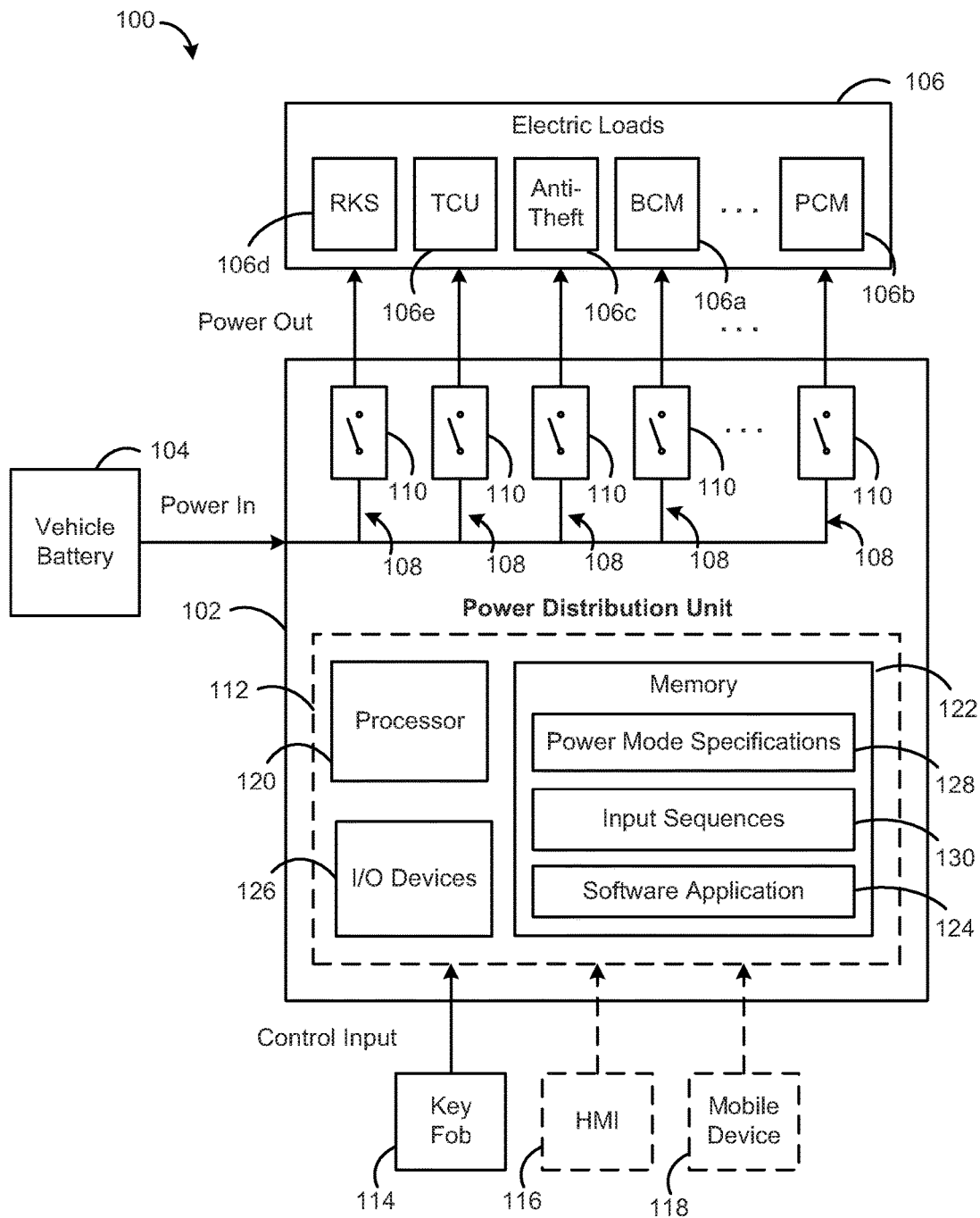
FIG. 1 depicts an example vehicle system for preserving battery power in a vehicle, in accordance with embodiments.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

FIG. 1 illustrates an exemplary vehicle system 100 for preserving battery power in a vehicle (not shown), in accordance with embodiments. The vehicle system 100 may be implemented in any suitable type of vehicle (not shown), such as an electric vehicle, hybrid electric vehicle (HEV), plug-in electric vehicle (PHEV), or battery electric vehicle (BEV). In some cases, portions of the vehicle system 100 may be implemented as part of a vehicle computing system (VCS) of the vehicle, for example, within a vehicle electronics system or an infotainment system of the vehicle, in accordance with embodiments. For example, the vehicle computing system may be an infotainment system such as the SYNC® system manufactured by FORD MOTOR COMPANY®. Other embodiments of the vehicle system 100 can include different, fewer, or additional components than those described below and shown in FIG. 1.

As illustrated, the vehicle system 100 includes a power distribution box or unit 102 coupled to a vehicle battery 104 and a plurality of electric loads 106. The vehicle battery 104 can be a low-voltage or starter battery, such as, for example, a 12 V battery, or an auxiliary battery having a nominal voltage, such as, for example, 48 V or higher. The vehicle battery 104 can be used to power numerous components, controllers, modules, motors, actuators, sensors, lights, and other electronics from various vehicle systems and subsystems, including, for example, a body control module (BCM) 106a, a powertrain control module (PCM) 106b, a vehicle anti-theft system 106c, a remote keyless system (RKS) 106d, a telematics control unit (TCU) 106e, and the other electronic control units (ECUs) included in the vehicle system 100. In FIG. 1, these various components and electronics are generally represented as the electric loads 106. In some embodiments, the power distribution box 102 is operatively coupled to the body control module 106a for receiving commands therefrom, and/or transmitting commands thereto, for example, in association with activating a selected power-saving mode, as described herein.

According to embodiments, the power distribution unit 102 can distribute power from the vehicle battery 104 to each electric load 106 using a plurality of electrical connections 108. As shown in FIG. 1, each connection 108 (or connection path) can be configured to separately couple a respective one of the electrical loads 106 to the vehicle battery 104 (e.g., in parallel). For example, an output end of each connection path 108 can be coupled to a respective one of the plurality of electric loads 106, and an input end of each connection path 108 can be connected to the vehicle battery 104. In some embodiments, the power distribution unit 102 may be implemented as an integrated circuit or chip having one or more input pins connected to the battery 104 and a plurality of output pins respectively connected to the plurality of electric loads 106, with the connection paths 108 extending internally between the output pins and input pin(s). As will be appreciated, the total number of connection paths 108 within the power distribution unit 102 can vary depending on the number of electric loads 106 coupled to the distribution unit 102 and/or an available number of output pins on the integrated circuit.

As illustrated, the power distribution unit 102 further includes switching circuitry 110 coupled to each connection path 108 for selectively coupling the connection path 108 to the vehicle battery 104, and/or selectively energizing or powering the electric load 106 coupled to the connection path 108. For example, when the switching circuitry 110 is in an "off" position (or turned off), the connection path 108, and the electric load 106 coupled thereto, may be disconnected from the vehicle battery 104 and when the switching circuitry 110 is in an "on" position (or turned on), the connection path 108, and the electric load 106 coupled thereto, may be connected to the vehicle battery 104. In embodiments, the switching circuitry 110 can include one or more electronic switches, such as, for example, a solid-state relay or power switch (e.g., comprising a field-effect transistor (e.g., MOSFET), a gallium nitride (GaN) transistor, or other fast-switching semiconductor devices), or an insulated-gate bipolar transistor (IGBT). The switching circuitry 110 may also include other electronics and semiconductors that are also designed to minimize power loss at the distribution unit 102 when disconnecting the corresponding electric load 106 from the vehicle battery 104.

According to embodiments, the vehicle system 100 can further include a power saving module 112 configured to preserve battery power when the vehicle is parked or otherwise stationary for an extended period of time (e.g., for several weeks). The power saving module 112 can achieve this, at least in part, by disconnecting select electric loads 106, or the connection paths 108 coupled thereto, from the vehicle battery 104, so as to minimize or eliminate any battery drainage stemming from the connection between the vehicle battery 104 and the corresponding electric load 106 while the vehicle is stationary. The power saving module 112 can determine which of the connection paths 108 to disconnect based on specifications associated with a vehicle power-saving mode selected by the vehicle owner, or user, prior to leaving the vehicle stationary.

More specifically, the power saving module 112 can be configured to offer, for user selection, a plurality of power-saving modes to use in different stationary scenarios. For example, the plurality of modes can include a storage mode for when a vehicle is put away during a downtime period that could last for several months, multiple seasons, or even years (e.g., seasonal cars, vehicles stored at a second home, etc.), a vacation or trip mode for when the vehicle will not be used for several weeks to a month while the user is away on a trip, and a shipping mode for when the vehicle will be shipped from one location to another, locally, nationally, or internationally. As will be appreciated, other types of power saving modes (also referred to herein as "vehicle power modes") may be contemplated and are intended to be included in the plurality of vehicle power modes described herein.

Each power-saving mode may be associated with a different set of specifications designed to provide the amount or type of battery preservation that is appropriate for the given scenario. For example, to provide appropriate battery preservation for each of these modes, a different subset, or combination, of the electric loads 106 may need to be disconnected from the vehicle battery 104, and/or a different subset of the electric loads 106 may need to remain connected to the vehicle battery 104. Accordingly, the set of specifications associated with each vehicle power mode can identify at least one of the subset of electric loads 106 to disconnect from the vehicle battery 104 upon activation of the corresponding vehicle power mode, or the subset of electric loads 106 to keep connected during that mode.

Various factors can determine which of the electric loads 106 should remain active and which can be safely disconnected when the vehicle is placed in a select one of the plurality of vehicle power modes. These factors can include, for example, how long the vehicle will remain stationary (e.g., weeks, months, years), the environment in which the vehicle will be left stationary (e.g., climate, season, type of enclosure or building, if any, etc.), the model, make, or other characteristic of the vehicle, which of the electric loads 106 are safe to disconnect while the vehicle is stationary, which vehicle operations or functions should remain accessible while the vehicle is stationary, and/or which of the electric loads 106 have the most impact on battery drainage within the vehicle system 100.

In some cases, one or more of the electric loads 106 may be partially disabled, such that the electric load 106, itself, remains connected to the vehicle battery 104 but certain functionalities are disabled or turned off. For example, during normal operation, the TCU 106e may be configured to periodically wake up the vehicle system 100 to query a status of the vehicle, including fuel level, windows status, etc., and send the vehicle status to the owner (e.g., via a mobile device paired to the vehicle). The set of specifications for a given vehicle power mode may instruct the TCU 106e to disable such functionalities, but keep the TCU 106e active so that, for example, when the user returns to the vehicle, the TCU 106e can receive a key fob command or other user input for disabling the vehicle power mode and restoring vehicle settings.

In some cases, the set of specifications for each vehicle power mode may identify one or more electric loads 106 that are unique to that mode, as well as one or more electric loads 106 that are common to all modes. For example, for all vehicle power modes, the subset of electric loads 106 to be disconnected from the vehicle battery 104 may include the powertrain control module (PCM) 106b, a navigation system (not shown), an entertainment system (not shown), a restraint control module (not shown), a tire pressure monitoring system (not shown), a vehicle camera system (not shown), or any other electric load 106 that will not be needed while the vehicle is stationary. As another example, for all vehicle power modes, the subset of electric loads 106 to keep connected to the vehicle battery 104 may include the anti-theft system 106c, so that that engine immobilizer and other anti-theft devices can continue to keep the vehicle secure throughout the stationary period. However, for the vacation mode, the subset of electric loads 106 to remain connected may also include the remote keyless system (RKS) 106d and/or the telematics control unit (TCU) 106e, so that the vehicle owner can use a key fob associated with the vehicle to unlock or otherwise access the vehicle upon returning from vacation, whereas for the storage and shipping modes, the RKS 106d and/or the TCU 106e may be disabled or disconnected.

According to embodiments, the power saving module 112 can receive a control input indicating user selection of one of the plurality of vehicle power modes from a key fob 114 (or key fob device) communicatively coupled to the vehicle system 100, a human-machine interface (HMI) 116 included in the vehicle system 100, a mobile device 118 communicatively coupled to the vehicle system 100, or other user interface of the vehicle system 100. For example, each vehicle power mode may be assigned a unique input sequence, and the power saving module 112 can identify the selected vehicle power mode based on the input sequence received from the key fob 114, the HMI 116, or the mobile device 118.

In a preferred embodiment, the control input may be received from the key fob 114 upon user entry of an appropriate input sequence using input devices (not shown) included on the key fob 114. In general, the key fob 114 can be configured to provide a user with remote, keyless control of various operations or functions of the vehicle, such as, for example, locking and unlocking vehicle door locks, opening and/or closing electronically-operated vehicle doors (e.g., a trunk, tailgate, sliding door, etc.), starting an engine of the vehicle, and/or activating a vehicle alarm system. The key fob 114 may be pre-configured to enable direct control of these vehicle operations by the vehicle manufacturer or an entity associated therewith. The input devices included on the key fob 114 can be operated by the user to convey the operational commands to the vehicle, as well as initiate one of the vehicle power modes. As an example, the key fob input devices can include one or more keys, buttons or push buttons, switches, sliders, knobs, dials, and/or touch input devices. Each of the input sequences for initiating an assigned vehicle power mode can include a certain ordered combination of inputs or selections made using one or more of the input devices and can include different types of inputs, such as, e.g., a long hold (e.g., 4 seconds), short hold (e.g., 2 seconds), single tap, or double tap.

The key fob 114 can be communicatively coupled to the remote keyless system (RKS) 106d and/or the telematics control unit (TCU) 106e of the vehicle system 100 via a short-range wireless communications network, such as, for example, BLUETOOTH, Radio Frequency Identification (RFID), or Near Field Communications (NFC), for communicating user inputs to the power saving module 112. For example, the RKS 106d and/or the TCU 106e may be configured to differentiate the key fob input sequences for initiating a vehicle power mode from key fob inputs for controlling standard vehicle operations and provide the former input sequences to the power saving module 112 for further processing. In some cases, the key fob 114 can be pre-programmed to accept the input sequences for indicating user selection of an associated vehicle power mode, for example, by the vehicle manufacturer. In other cases, the key fob 114 can be retro-fitted or re-programmed to accept these input sequences.

In other embodiments, the control input may be received from the HMI 116 upon user entry of an appropriate input sequence (e.g., via menu selection(s), vehicle settings selection(s), etc.) using one or more buttons, switches, keys, touchscreens, or other input devices (not shown) included in the HMI 116. In such cases, the HMI 116 can be operatively coupled to the power saving module 112, via a wired or wireless connection, to provide the received input sequence thereto. The HMI 116 (also referred to as a "user interface") can be an electronic control unit for enabling user interaction with the vehicle system 100 and for presenting vehicle information to the vehicle operator or driver. Though not shown, the HMI 116 can comprise an instrument panel (IP), a media display screen, as well as one or more input devices and/or output devices for inputting, entering, receiving, capturing, displaying, or outputting data associated with the vehicle system 100, the method 200 shown in FIG. 2, or the techniques disclosed herein. The HMI 116 can be configured to interact with the other ECUs of the vehicle system 100 and/or the power saving module 112 in order to provide information or inputs received via the HMI 116 to an appropriate component of the vehicle system 100 and to present, to the vehicle operator or driver, information or outputs received from the various components of the vehicle system 100.

In still other embodiments, the control input may be received from the mobile device 118 upon user entry of an appropriate input sequence using a user interface of the mobile device 118 and a mobile application (not shown) for controlling vehicle settings (e.g., a manufacturer-provided vehicle application). In such cases, the mobile device 118 may be communicatively coupled to the TCU 106e via a wireless communications network, such as, for example, WiFi, cellular, BLUETOOTH, Radio Frequency Identification (RFID), or Near Field Communications (NFC), and the TCU 106e can be configured to provide any input sequences received via the mobile device 118 to the power saving module 112 for further processing. The mobile device 118 can be any type of portable electronic device, including, for example, a smartphone or other mobile telephone, a tablet or tablet-type personal computer, a personal digital assistant (PDA), a smartwatch or other wearable device, and the like. The mobile device 118 can be paired or linked to the vehicle system 100 using known wireless pairing techniques for authorizing communications between the mobile device 118 and the vehicle system 100.

Referring still to FIG. 1, the remote keyless system (RKS) 106*d* of the vehicle system 100 can be an electronic control unit for controlling and monitoring remote, keyless interactions between the key fob 114 and the vehicle system 100. The RKS 106*d* can include a remote keyless entry system and in some cases, a remote keyless ignition system. In the latter case, the RKS 106*d* may also be referred to as a "passive entry passive start (PEPS) system." In some embodiments, the RKS 106*d* can be a separate, stand-alone ECU that is interconnected to the BCM 106*a*, PCM 106*b*, TCU 106*e*, and other ECUs of the vehicle system 100 via a vehicle bus (not shown) in order to carry out the RKS/PEPS operations. In other embodiments, the RKS 106*d* may be comprised of multiple segments that are incorporated into various ECUs of the vehicle system 100 to help process the RKS/PEPS commands received at each ECU. In still other embodiments, the RKS 106*d* may be included within one ECU, such as, e.g., the TCU 106*e*, in order to handle or process RKS/PEPS commands as they are received by a wireless communication module of the TCU 106*e*.

The wireless communication module of the TCU 106*e* (also referred to as a "vehicle telematics unit") may include one or more antennas, radios, modems, receivers, transmitters, telephonic interfaces, cellular communication ports, routers, or other types of network communication equipment for enabling the vehicle system 100 to connect to various wireless networks, including, for example, GPS, WiFi, cellular, BLUETOOTH, NFC, RFID, satellite, and/or infrared. For example, the TCU 106*e* can include a short range transceiver (e.g., BLUETOOTH, RFID, NFC, infrared) for transmitting signals to and receiving signals from the key fob 114 and a cellular or WiFi transceiver for transmitting signals to and receiving signals from the mobile device 118, or a remote server in communication with the mobile device 118.

As shown in FIG. 1, in some embodiments, the power saving module 112 is integrated into the power distribution unit 102. In other embodiments, the power saving module 112 can be a separate or standalone control module or unit that is operatively coupled to the power distribution unit 102 and still included in the vehicle system 100. In still other embodiments, the power saving module 112 can be added to an existing electronic control unit of the vehicle system 100, such as, for example, the body control module 106*a*, and thereby, operatively coupled to the power distribution unit 102.

As illustrated, the power saving module 112 can include a processor 120 for controlling operation of the power distribution unit 102 and/or the power saving module 112. For example, the processor 120 can be configured to control the switching circuitry 110 coupled to the connection paths 108 in order to selectively disconnect certain electrical loads 106 from the vehicle battery 104 upon receiving a control input indicating user selection of a vehicle power mode. In embodiments, the processor 120 can comprise one or more of a microprocessor, a microcontroller, a programmable logic array, an application-specific integrated circuit, a logic device, or other electronic device for processing, inputting, outputting, manipulating, storing, or retrieving data. The processor 120 can be configured to execute software stored within a memory 122 of the vehicle system 100, to communicate data to and from the memory 122, and to generally control operations of the power distribution unit 102 and/or the power saving module 112 pursuant to the software.

The memory 122 can be included in the power saving module 112, along with the processor 120 (e.g., as shown in FIG. 1), or can be separate from the power saving module 112, for example, if the processor 120 is included in another ECU of the vehicle system 100. The memory 122 can comprise one or more of electronic memory, nonvolatile random access memory (e.g., RAM), flip-flops, a computer-writable or computer-readable storage medium, or other electronic device for storing, retrieving, reading, or writing data. The memory 122 can be configured to store executable software that may include one or more separate programs, each comprising an ordered listing of machine readable instructions that, when executed by processor 120, cause the processor 120 to perform various acts and/or implement logical functions.

As an example, the software in memory 122 may include a software application 124 comprising instructions to control operation of the power saving module 112 and/or the switching circuitry 110 coupled to each connection path 108 in accordance with control inputs received by the power saving module 112. In some cases, when executed by the processor 120, the software application 124 can cause the processor 120 to receive, via one or more input/output devices 126, a control input indicating user selection of a vehicle power mode, to identify the subset of electric loads 106 that should be disconnected from the vehicle battery 104 based on the selected vehicle power mode, and to disconnect the identified electric loads 106 from the vehicle battery 104 by turning off the switching circuitry 110 associated with each identified electric load 106.

The memory 122 can also store information related to controlling operation of the power distribution unit 102 and/or the power saving module 112 in response to control inputs received via one or more input/output (I/O) devices 126. As shown in FIG. 1, the stored information can include a plurality of power mode specifications 128, or more specifically, the set of specifications associated with each vehicle power mode offered by the power saving module 112, as described herein. As also shown in FIG. 1, the stored information can include a plurality of input sequences 130, or more specifically, information describing or identifying the input sequence (e.g., key fob input) assigned to each vehicle power mode, as described herein. In some embodiments, the specifications 128 and the input sequences 130 can be stored in the memory 122 as look-up tables in association with the corresponding vehicle power modes. In one example embodiment, the specifications 128 and the input sequences 130 can be stored in a single look-up table organized by vehicle power mode.

The I/O devices 126 can include one or more input and/or output (I/O) devices (or peripherals) for interacting with interactive hardware (not shown) operatively coupled to the power saving module 112 and/or the power distribution unit 102. For example, the I/O devices 126 can be used to interact with communication devices included in the vehicle system 100, such as, e.g., the wireless communication module (not shown) included in the TCU 106*e*, for receiving control inputs from the key fob 114 or the mobile device 118.

In some embodiments, the I/O devices 126 can include a dedicated, user-selectable button or other input device (not shown) configured to de-activate a currently-active vehicle power mode and restore the vehicle settings to a normal power mode. Such a dedicated input device may be required for situations in which the activated vehicle power mode turns all vehicle systems and modules off, or at least the modules that are capable of receiving user-entered control inputs, such as, for example the RKS 106*d* and/or TCU 106*e*. Upon user selection of the dedicated input device, a sufficient amount of power can be sent to the processor 120 along with a signal to de-activate the current vehicle power mode. In response to this signal, the processor 120 may turn on or re-connect any switching circuitry coupled between the processor 120 and the vehicle battery 104, to ensure that the processor 120 remains powered while restoring vehicle settings.

If the currently-active vehicle power mode keeps the RKS 106*d* and/or the TCU 106*e* active enough to receive key fob inputs, the key fob 114 may be used to restore the vehicle to a normal power mode. For example, in some cases, entering, for a second time, the same input sequence used to activate the vehicle power mode may cause the processor 120 to de-activate the vehicle power mode. In other cases, a separate key fob input sequence may be assigned to deactivating the vehicle power mode. In still other embodiments, turning the vehicle on (e.g., using the ignition key or an engine start button) may automatically de-activate the vehicle power mode. In such cases, a portion of the powertrain control module 106*b*, or other module for controlling the ignition of the vehicle, may remain active during the vehicle power mode in order to allow the vehicle engine.

Regardless of how a command to de-activate a current vehicle power mode is received, in response to this command, the processor 120 can restore the vehicle settings by re-enabling or turning on any switching circuitry 110 that was turned off when activating the vehicle power mode, thus re-connecting the vehicle battery 104 to the corresponding electric loads 106.

Figure 2:
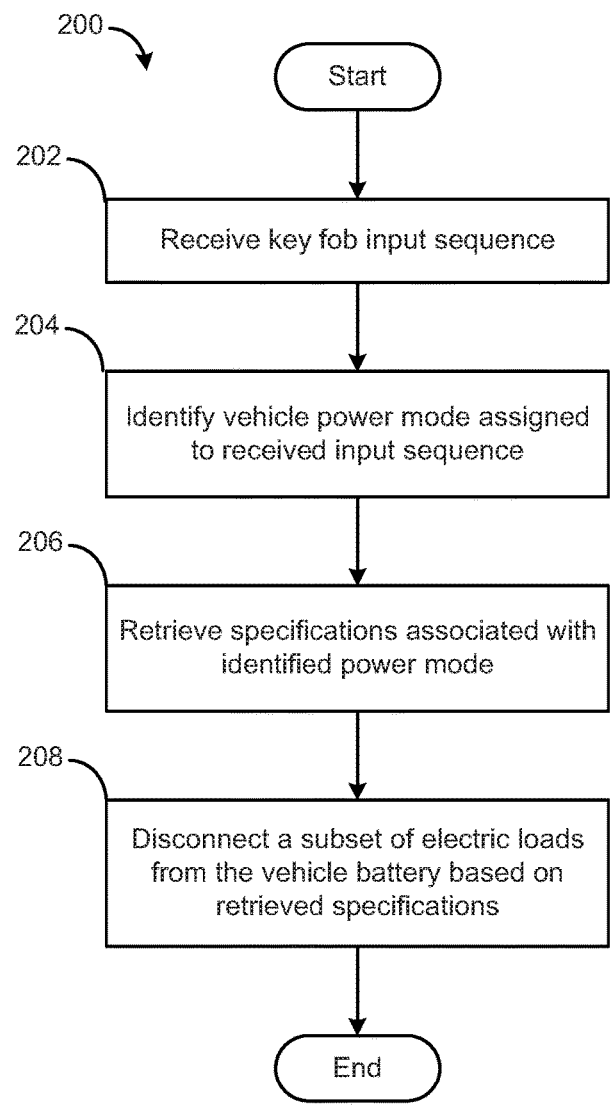
FIG. 2 depicts an exemplary method for preserving battery power in a vehicle, in accordance with embodiments.

FIG. 2 illustrates an example method 200 for preserving battery power in a vehicle while the vehicle remains parked or stationary for an extended period of time, in accordance with embodiments. The method 200 can be carried out by a vehicle system (e.g., vehicle system 100 shown in FIG. 1), a power distribution unit included therein (e.g., power distribution unit 102 shown in FIG. 1), or more specifically, a computing device included in either, such as, for example, power saving module 112 shown in FIG. 1. For example, the method 200 may be implemented, at least in part, by a processor (e.g., the processor 120 shown in FIG. 1) of the computing device executing a software application (e.g., the software application 124 shown in FIG. 1) stored in a memory (e.g., the memory 122 shown in FIG. 1) of the computing device. Further, to carry out the operations of the method 200, the computing device can interact with a key fob (e.g., the key fob 114 shown in FIG. 1) communicatively coupled to the vehicle system, a mobile device (e.g., the mobile device 118 shown in FIG. 1) communicatively coupled to the vehicle system, or a human-machine interface (HMI) (e.g., HMI 116 shown in FIG. 1) included in the vehicle system. The computing device may also interact with, or control, switching circuitry (e.g., the switching circuitry 110 shown in FIG. 1) configured to selectively disconnect a plurality of electric loads (e.g., the electric loads 106 shown in FIG. 1) from a vehicle battery (e.g., the vehicle battery 104 shown in FIG. 1).

As shown in FIG. 2, the method 200 can begin at step 202 where the processor receives an input sequence indicating user selection of one of a plurality of vehicle power modes. The input sequence may be received from the key fob, the mobile device, or the HMI, via an I/O device (e.g., the I/O devices 126 shown in FIG. 1) of the computing device, as described herein. At step 204, the processor identifies the vehicle power mode that is assigned to the input sequence received at step 202. As described herein, each of the plurality of vehicle power modes can be assigned a unique input sequence that is stored in the memory (e.g., the input sequences 120 shown in FIG. 1). In response to receiving an input sequence, the processor may access the memory to compare the received input sequence to the input sequences in order to determine which vehicle power mode has been selected.

At step 206, the processor retrieves, from the memory, the set of specifications (e.g., the power mode specifications 128 shown in FIG. 1) associated with the vehicle power mode identified in step 204. As described herein, each vehicle power mode can be associated with a different set of specifications that identifies which of the electric loads to disconnect from the vehicle battery upon activation of the vehicle power mode. For example, the plurality of vehicle power modes may include a first vehicle power mode associated with a first set of specifications identifying a first subset of the electric loads for disconnection from the vehicle battery, and a second vehicle power mode associated with a second set of specifications identifying a second subset of the electric loads for disconnection from the vehicle battery, wherein the second set of specifications is different from the first set of specifications.

At step 208, the processor disconnects a subset of the electric loads included in the vehicle system from the vehicle battery based on the specifications retrieved in step 206. For example, the specifications may indicate that for the selected vehicle power mode, electric loads A, B, and D should be disconnected from the vehicle battery, while electric load C should remain connected. As described herein, each electric load may be coupled to the vehicle battery by a separate connection path (e.g., the connection paths 108 shown in FIG. 1), and each connection path may include an electronic switch or other switching circuitry for selectively disconnecting the corresponding electric load from the vehicle battery. Thus, in order to disconnect the specified electric loads, the processor may turn off the switching circuitry that is associated with the electric loads A, B, and D. After completion of step 208, the user-selected vehicle power mode may be activated, and the method 200 may end.

It should be understood that any circuit or other electrical device disclosed herein may include any number of discrete passive and active components that are not explicitly listed herein, such as, for example, resistors, capacitors, transistors, amplifiers, analog/digital converters (ADC or A/D converters), microprocessors, integrated circuits, non-transitory memory devices (e.g., FLASH, random access memory (RAM), read only memory (ROM), electrically programmable read only memory (EPROM), electrically erasable programmable read only memory (EEPROM), or other suitable variants thereof), and software which cooperates with one another to perform operation(s) disclosed herein.

In certain embodiments, the process descriptions or blocks in the figures, such as FIG. 2, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A vehicle comprising:
   a power distribution unit (PDU) including switches between electric loads and a battery; and
   a power saving module configured to:
      receive a selection for a vehicle power mode from a key fob;
      disconnect a first set of the electric loads, via the PDU, when the selection is a first power mode; and
      disconnect a second set of the electric loads, via the PDU, when the selection is a second power mode.

2. The vehicle of claim 1, wherein each of the switches is operatively coupled to the power saving module to enable selective disconnection of the electric loads from the battery based on the selection for the vehicle power mode.

3. The vehicle of claim 2, wherein the power saving module disconnects one or more of the electric loads to turn off the one or more of the electric loads.

4. The vehicle of claim 1, wherein the first power mode is different than the second power mode and the first set of the electric loads is different than the second set of the electric loads.

5. The vehicle of claim 1, wherein the power saving module includes memory for storing which of the electric loads correspond with each of a plurality of vehicle power modes.

6. The vehicle of claim 5, wherein each of the plurality of vehicle power modes corresponds with a unique key fob input sequence that is stored in the memory.

7. The vehicle of claim 1, wherein the plurality of vehicle power modes includes a vacation mode, a storage mode, and a shipping mode.

8. A vehicle comprising:
   a battery;
   electrical loads;
   a power distribution unit including switches between the electric loads and the battery;
   a communication module configured to receive a selection of a vehicle power mode from a key fob, the communication module being one of the electric loads; and
   a power saving module configured to disconnect the communication module from the battery, via the power distribution unit, responsive to the communication module receiving the selection.

9. The vehicle of claim 8, wherein the selection includes entry of a unique input sequence assigned to the vehicle power mode.

10. The vehicle of claim 9, wherein the unique input sequence is stored in memory of the power saving module in association with the vehicle power mode.

11. The vehicle of claim 8, wherein the power saving module is included in the power distribution unit.

12. The vehicle of claim 8, wherein each of the switches is operatively coupled to the power saving module to enable selective disconnection and connection of the electric loads from the vehicle battery.

13. A method for a vehicle, comprising:
   receiving, via a communication module, a selection of a vehicle power mode from a key fob;
   disconnecting, via a power distribution unit, a first subset of electric loads of the vehicle from a battery when the selection is a first power mode; and
   disconnecting, via the power distribution unit, a second subset of electric loads of the vehicle from the battery when the selection is a second power mode.

14. The method of claim 13, wherein one or more electric loads of the vehicle are disconnected via the power distribution unit to turn off the one or more electric loads.

15. The method of claim 13, further comprising, upon receiving the selection, retrieving, from memory, the one or more electric loads associated with the selection.

16. The method of claim 14, wherein each of a plurality of vehicle power modes corresponds with a unique input sequence of the key fob, and further comprising, in response to receiving an input sequence from the key fob, identifying which of the vehicle power modes corresponds with the input sequence.

17. The method of claim 13, wherein the first power mode is different than the second power mode and the first subset of electric loads is different than the second subset of electric loads.

* * * * *